(12) United States Patent
Rasmussen

(10) Patent No.: US 9,957,101 B2
(45) Date of Patent: May 1, 2018

(54) DISPOSABLE BREWING DEVICE

(71) Applicant: Columbus E. ApS, Middelfart (DK)

(72) Inventor: Ulrik Skovgaard Rasmussen, Middelfart (DK)

(73) Assignee: COLUMBUS E. APS, Middelfart (DK)

( * ) Notice: Subject to any disclaimer, the term of this patent is extended or adjusted under 35 U.S.C. 154(b) by 316 days.

(21) Appl. No.: 14/430,708

(22) PCT Filed: Sep. 24, 2012

(86) PCT No.: PCT/DK2012/050356
§ 371 (c)(1),
(2) Date: Mar. 24, 2015

(87) PCT Pub. No.: WO2014/044279
PCT Pub. Date: Mar. 27, 2014

(65) Prior Publication Data
US 2015/0251846 A1    Sep. 10, 2015

(51) Int. Cl.
*B65D 85/804* (2006.01)
*B65D 75/00* (2006.01)
(Continued)

(52) U.S. Cl.
CPC .......... *B65D 85/8043* (2013.01); *A47J 31/18* (2013.01); *B65D 75/008* (2013.01); *B65D 75/5883* (2013.01); *B65D 85/816* (2013.01)

(58) Field of Classification Search
CPC .................. B65D 85/8043; B65D 85/816; B65D 75/008; B65D 75/5883; A47J 31/18
See application file for complete search history.

(56) References Cited

U.S. PATENT DOCUMENTS 1,498,491 A    6/1924  Stinson
3,372,634 A    3/1968  Brinkman
(Continued)

FOREIGN PATENT DOCUMENTS

JP    2000-237021    *  9/2000
JP    2009-227282    * 10/2009
(Continued)

OTHER PUBLICATIONS

International Search Report for corresponding application PCT/DK2012/050356 filed Sep. 24, 2012; dated May 31, 2013.

*Primary Examiner* — Anthony Weier
(74) *Attorney, Agent, or Firm* — Cantor Colburn LLP

(57) ABSTRACT

A disposable brewing device including an inner compartment formed at least partly by a liquid-permeable material and having an entrance opening for introducing liquid into said brewing device, the disposable brewing device also including aroma material contained within the inner compartment and an outer compartment forming a brewing container, where the brewing container is formed by a liquid-impermeable material, where the inner compartment is integrated within the outer compartment and the outer compartment further includes a discharge arrangement including an exit opening through which the liquid exits the brewing device, where a liquid-impermeable barrier is arranged between the at least one inner compartment and the exit opening substantially blocks the aroma material and liquid in the inner compartment from passing directly from the at least one inner compartment and out through the exit opening, when the liquid is poured out of the exit opening.

18 Claims, 6 Drawing Sheets

(51) Int. Cl.
    *B65D 75/58* (2006.01)
    *B65D 85/816* (2006.01)
    *A47J 31/18* (2006.01)

(56) References Cited

U.S. PATENT DOCUMENTS

| | | | |
|---|---|---|---|
| 3,631,793 A * | 1/1972 | Bednartz | C22B 1/214 |
| | | | 210/348 |
| 4,886,674 A | 12/1989 | Seward | |
| 6,273,307 B1 | 8/2001 | Gross | |
| D448,602 S | 10/2001 | Bodum | |
| 7,793,585 B2 * | 9/2010 | Rasmussen | B65D 85/816 |
| | | | 426/433 |
| 8,062,683 B2 * | 11/2011 | Rasmussen | B65D 85/816 |
| | | | 426/431 |
| 8,225,711 B1 * | 7/2012 | Andre | A47J 31/02 |
| | | | 99/295 |
| 8,404,294 B2 * | 3/2013 | Rasmussen | B65D 85/816 |
| | | | 426/431 |
| 8,523,440 B2 * | 9/2013 | Walker | B65D 33/24 |
| | | | 383/202 |
| 2007/0199453 A1 * | 8/2007 | Rasmussen | B65D 85/816 |
| | | | 99/279 |
| 2008/0003337 A1 * | 1/2008 | Rasmussen | B65D 85/816 |
| | | | 426/433 |
| 2011/0011270 A1 * | 1/2011 | Shih | A47G 19/14 |
| | | | 99/279 |
| 2012/0037006 A1 * | 2/2012 | Rasmussen | B65D 85/816 |
| | | | 99/279 |

FOREIGN PATENT DOCUMENTS

| | | |
|---|---|---|
| RU | 74054 | 6/2008 |
| WO | 2005105604 A1 | 11/2005 |
| WO | 2005105606 A1 | 11/2005 |
| WO | 2005105608 A1 | 11/2005 |

* cited by examiner

Prior Art

Prior Art

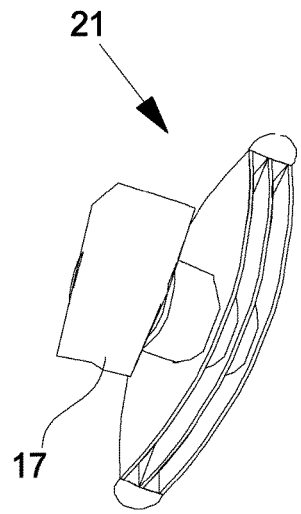
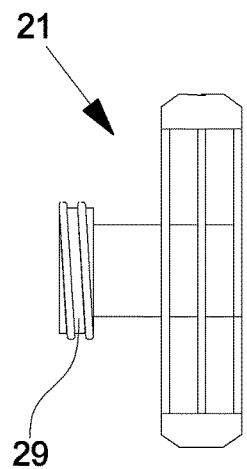
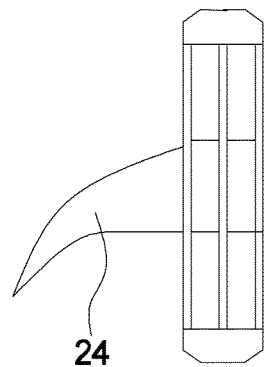
Fig.13   Fig.14   Fig.15
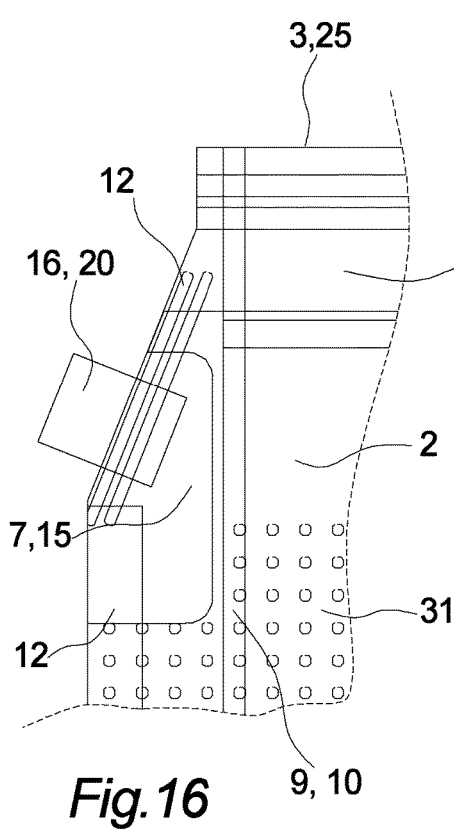
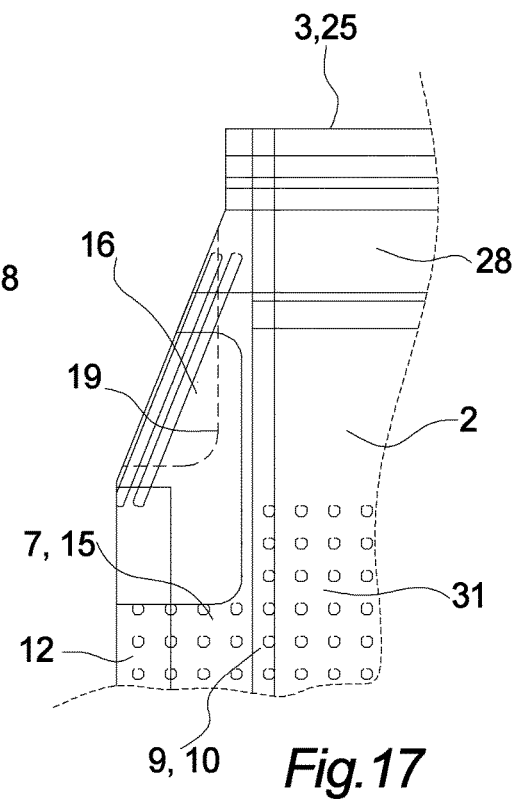
Fig.16   Fig.17

DISPOSABLE BREWING DEVICE

FIELD OF THE INVENTION

The invention relates to a disposable brewing device comprising at least one inner compartment containing an aroma material and at least one outer compartment. The invention further relates to use of a disposable brewing device.

BACKGROUND OF THE INVENTION

A coffee maker such as described in USD448602S constitutes both a coffee maker and a coffee pot in one device. However this kind of coffee maker requires cleaning after use and is not well-suited for one-time-use. The equipment is too expensive and is per se not suitable for disposal.

Thus, from WO 2005/105604 A1 it is therefore known to form a self-standing disposable brewing device from film layers welded together. E.g. ground coffee is arranged in a filter device inside the brewing device, so that when hot water is introduced into the device through the top opening, the water will pass down through the ground coffee and the filter device, and down to a bottom compartment. However, when the brewed coffee is poured out of the brewing device it has to pass through the ground coffee and the filter device again hereby impeding the pouring process and increasing the risk of the ground coffee following the brewed coffee out of the brewing device. Thus, it is also disclosed that a welding can be made along one side of the filter material to prevent that the aroma material is mixed with the brewed liquid, when this is poured out of the device. But aroma material and/or un-brewed liquid may still pass the welding and be mixed with the brewed and filtered liquid exiting the device through the exit opening.

From WO 2005/105606 A1 it is therefore known to place the filter device in front of the exit opening in the disposable brewing device so that the aroma material—such as ground coffee—is filtered out before the coffee leaves the brewing device.

However this design entails that only some of the water pass through only some of the ground coffee—hereby reducing the quality of the brewed product—and the ground coffee will partly block the filter device hereby making it difficult to pour coffee from the brewing device. From WO 2005/105606 A1 it is also known to provide some sort of barrier between the aroma material in the filter device and the outlet duct. However, as soon as the brewing device is tilted to pour the brewed liquid out of the brewing device or if the brewing device is moved about a bit too quickly or in attempt to get out everything in one pour during the pouring process, the non-filtered aroma material may still pass the barrier and mix with the filtered liquid being poured out of the brewing device.

BRIEF SUMMARY

The invention provides for a disposable brewing device from which the brewed liquid can safely and easily be poured and at the same time reducing the risk of aroma material and/or un-brewed liquid inside the brewing device leaving the device along with the brewed liquid, when the brewed liquid is being poured out of the disposable brewing device.

The invention provides for a disposable brewing device comprising at least one inner compartment, wherein the inner compartment is formed at least partly by a liquid-permeable material and comprising an entrance opening for introducing liquid into said brewing device. The disposable brewing device also comprises aroma material being contained within the at least one inner compartment and at least one outer compartment forming a brewing container, wherein the brewing container is formed by a liquid-impermeable material. The at least one inner compartment is integrated within the outer compartment and the outer compartment further comprises a discharge arrangement including an exit opening through which the liquid exits the brewing device, wherein a liquid-impermeable barrier is arranged between the at least one inner compartment and the exit opening to substantially block the aroma material and liquid in the inner compartment from passing directly from the at least one inner compartment and out through the exit opening, when the liquid is poured out of the exit opening.

The aroma is highly concentrated in the aroma material and the aroma material is usually solid e.g. in the form of tea leafs, ground coffee or the like. Among other for these reasons it is damaging to the quality of the brewed product if the aroma material is mixed with the brewed and filtered liquid, when the filtered liquid is poured out of the brewing device. Furthermore, the liquid in the inner compartment has not yet passed through the aroma-material and is therefore not brewed yet. It is therefore also damaging to the quality of the brewed product if this un-brewed liquid is mixed with the brewed product exiting the brewing device. Thus, it is advantageous to form, shape and make the brewing device so that a liquid-impermeable barrier is arranged between the inner compartment and the discharge arrangement to prevent the aroma material and the un-brewed liquid in the inner compartment from passing directly from the inner compartment to exit opening of the discharge arrangement, when the liquid is poured out of the exit opening.

In an aspect of the invention, said liquid-impermeable barrier is formed integrally with said at least one outer compartment.

Forming the liquid-impermeable barrier integrally with the outer compartment is advantageous in that it enables a simple brewing device design and it enables that the barrier may be arranged substantially anywhere inside the outer compartment.

In an aspect of the invention, said liquid-impermeable barrier is formed by a welding between said discharge arrangement and at least one of said at least one inner compartment.

Forming the liquid-impermeable barrier as a welding is a simple and inexpensive way of forming an efficient barrier.

In an aspect of the invention, said liquid-impermeable barrier substantially extends continuously between a bottom of said at least one inner compartment and said entrance opening.

If the liquid-impermeable barrier substantially extends continuously at least between the bottom of the inner compartment and the entrance opening direct passage between the inner compartment and the exit opening is fully blocked.

In an aspect of the invention, said exit opening is arranged at said entrance opening.

It is obviously advantageous to place the entrance opening at the top of the brewing device to ensure that the liquid can easily be poured into the brewing device and to ensure that the liquid does not overflow event through the entrance opening is not sealed. But it is also advantageous to position the exit opening at the top of the device near the entrance opening to ensure that the brewed liquid does not overflow through the exit opening e.g. in case an exit opening blocking device is not present and it enables that the brewed liquid can be removed controllably from the brewing device simply by tilting the brewing device to lower the exit opening in relation to the level of the brewed liquid inside the device and thereby pour brewed liquid out of the exit opening in a controlled manner.

In an aspect of the invention, said liquid-impermeable barrier is formed continuous with an outer edge welding of said brewing container.

Forming the liquid-impermeable barrier continuous with an outer edge welding of the brewing container is advantageous in that it provides for a simple manufacturing process and it entails that the position of the aroma material in the brewing device is more controlled.

In an aspect of the invention, said outer edge welding is an outer edge welding at said exit opening.

By forming the liquid-impermeable barrier continuous with an outer edge welding at the exit opening is advantageous in that the risk of non-filtered aroma material exiting through the exit opening during the pouring process is further reduced since the exit opening is better shielded.

In an aspect of the invention, said discharge arrangement is arranged alongside said at least one inner compartment.

As explained above it is advantageous that the both the entrance opening and the exit opening is arranged at the top of the brewing device and thus, to provide for a compact and advantageous design of the brewing device the discharge arrangement is arranged alongside the inner compartment.

Furthermore, arranging the discharge arrangement alongside the inner compartment is also advantageous in that the discharge arrangement and the inner compartment can be separated by only one welding hereby providing for a more compact and inexpensive brewing device.

In an aspect of the invention, said outer compartment is formed by a flexible film material.

Forming the outer compartment from a flexible film material is advantageous in that it hereby is simple and inexpensive to manufacture.

In an aspect of the invention, said brewing device comprises a substantially air-, aroma-, and liquid-impermeable outer sealing.

The outer sealing forms a barrier between the outer environment and the environment inside the sealing. Hereby the aroma material contained and other parts of the brewing device are better protected and the shelf life of the device is prolonged.

In an aspect of the invention, said brewing container is forming said outer sealing.

In a preferred embodiment no separate outer sealing is needed, as the liquid-impermeable material of the brewing compartment itself forms a sealed barrier for air comprising gasses such as oxygen, aroma and liquid such as water or moisture.

When the brewing container itself forms the outer sealing both material- and production-expenses in supplying an extra wrapping are saved, hereby providing for a simple brewing device design and a simple manufacturing process.

In an aspect of the invention, said brewing container is formed as a stand-up pouch, having a contact face adapted for maintaining the longitudinal extent of said brewing device in a substantial vertical stand-up position.

Forming the brewing container as a stand-up pouch e.g. by making the bottom of the device comprises a shape sealed fold to form a contact face supporting the device, is advantageous in that it enables that the device is self-standing and hence no equipment is needed to support the brewing device, as the device stands by itself. The shape of the contact face—e.g. formed by a weld of the bottom fold—significantly affects the shape of the brewing container when filled with liquid, which means that the brewing container during use may attain e.g. a circular-, oval-, or rectangular-like bottom form.

In an aspect of the invention, said at least one outer compartment being formed at least partly by a film material to be expandable from a non-expanded state when filled with liquid.

Forming the outer compartment from a material which allows that the outer compartment may expand from a non-expanded state when filled with liquid is advantageous in that the non-expanded brewing device is less space consuming and thereby easier to store before use. Furthermore, the expandable feature enables the device to have specific qualities in non-expanded shape—such as little total volume, flat configuration means easy to store and pack—and in expanded state—such as specific ducts forming, a contact face forming at the bottom allowing the device to be self-standing in a vertical position etc.

In an aspect of the invention, said brewing device being self-standing/self-supported during use for brewing.

Making the device self-standing/self-supported at least during use for brewing is advantageous in that it enables that the device can stand by itself during use for brewing without the need for extra support equipment.

In an aspect of the invention, said brewing container and said inner compartment are formed as bags or pouches assembled by one or more welding at one or more edges.

Forming the brewing container and the inner compartment as bags or pouches is advantageous in that it provides for a simple brewing device design and doing by means of welding enables a simple and inexpensive manufacturing process.

In an aspect of the invention, said inner compartment is suspended inside said brewing container.

A better brewing quality is achieved if the added liquid can pass through the aroma material in the inner compartment instead of merely getting in contact with the aroma material—as with traditional tea bags. Thus, by suspending the inner compartment comprising the aroma material inside the brewing container gravity will pull the liquid through the aroma material and down into the brewing container hereby ensuring a simple and efficient brewing device.

In an aspect of the invention, said discharge arrangement also comprises an exit opening blocking device.

In an aspect of the invention, said discharge arrangement also comprises an exit opening blocking device.

Providing the discharge arrangement with an exit opening blocking device is advantageous in that it enables that the brewing device can be sealed during storage—to maintain and protect the quality of the aroma material and to prevent entry of unwanted foreign object—and that the exit opening can be blocked during use e.g. to prevent unwanted spillage of brewed liquid.

In an aspect of the invention, said exit opening blocking device comprises a peelable sealing.

Providing the exit opening blocking device with a peelable sealing is advantageous in that it securely blocks the exit opening while still being easy to remove. Furthermore, a peelable sealing is inexpensive and typically for one time use making it particularly suitable in relation to a disposable brewing device.

In an aspect of the invention, said exit opening blocking device comprises a screw cap.

A screw cap provided an efficient blocking device that can be opened and closed repeatedly.

In an aspect of the invention, said exit opening blocking device comprises a perforated tear line.

A perforated tear line can be formed without any additional material hereby providing an inexpensive exit opening blocking device suited for a disposable brewing device.

In an aspect of the invention, said exit opening blocking device comprises a tear strip.

A tear strip is inexpensive in relation to materials used and is therefore particularly suited for a disposable brewing device.

In an aspect of the invention, said exit opening comprises a pour spout.

Providing the exit opening with a pour spout is advantageous in that it enables that the brewed liquid can be poured out of the brewing device in a more controlled manner and it reduces the risk of the exit opening dripping.

The extent of a pour spout will force the sidewall of the brewing apart hereby increasing the risk of duct or channels forming through which liquid and/or aroma material may pass directly between the inner compartment and the exit opening when the liquid is being poured out of the exit opening and it is therefore particularly advantageous that a liquid-impermeable barrier is arranged between the inner compartment and the exit opening when the exit opening is formed as a pour spout.

In an aspect of the invention, said pour spout is arranged between at least a first sheet of flexible film material and at least a second sheet of flexible film material forming said outer compartment.

Arranging the pour spout between the sheets forming the outer compartment is advantageous in that it enables a simple manufacturing a solid fixation of the pour spout.

It should be noted that the reference to a first sheet and a second sheet does not exclude that these two sheets are connected e.g. in a fold i.e. first sheet and a second sheet could be two complete separate sheets but they could also be formed by one sheet being folded to be arranged on either sides of the outer compartment.

In an aspect of the invention, said pour spout is welded to the outer compartment, which will simplify the manufacturing process and ensure a solid and liquid-proof connection between the pour spout and the outer compartment.

In an aspect of the invention, said exit opening comprises a pouring lip or pouring flap.

A pour lip or pour flap further reduces the risk of the exit opening dripping during use and it enables a more controlled pouring process.

In an aspect of the invention, said entrance opening is re-sealable.

Making the entrance opening re-sealable is advantageous in that ensures that the liquid in the device do not overflow through the entrance opening when liquid is poured out of the exit opening, it improves the safety of the product by preventing large amounts of hot liquid from exiting the device through the entrance opening if the device is accidently toppled during use and it enables a more controlled environment inside the brewing device before and during the brewing process.

In an aspect of the invention, said entrance opening is re-sealable by means of a flap, a slide fastener, a zip slider, an adhesive material or combinations thereof.

In an aspect of the invention, said liquid-impermeable barrier extends across the path of said re-sealable entrance opening.

Making the liquid-impermeable barrier extend across the path of the re-sealable entrance opening is advantageous in that the risk of the aroma material or un-brewed liquid passing directly from the inner compartment to the exit opening through the sealing arrangement at the entrance opening, when the liquid is poured out of the exit opening, is substantially eliminated.

And if the entrance opening is properly sealed when the liquid is poured out of the exit opening it is also ensured that aroma material does not leave the brewing device through the re-sealable entrance opening.

In an aspect of the invention, said brewing device is primarily formed by mutually welded film materials.

In an aspect of the invention, said aroma material comprises roast and/or ground coffee, instant coffee, tea, milk powder, herb, fruit, meat, chocolate powder, vegetables, grains or any combination thereof or any other materials which comprises or provides flavor or aroma or other functionalities.

Other functionalities than flavor or aroma may for example be color, consistency, energy etc.

The beverages made by the brewing device may for example be coffee, espresso, latte, mocha, tea, iced drinks, hot chocolate, blended drinks, fruit juices or any other edible or drinkable fluids.

In an aspect of the invention, said at least one outer compartment is at least partly formed by a transparent or translucent material.

Forming the outer compartment at least partly by a transparent or translucent material is advantageous in that it hereby is possible to more precisely dose the liquid into the device without the aid of measuring devices and it is possible to visually control and/or observe the brewing process. The storage capabilities i.e. shelf life of the brewing device before use may be reduced, as a translucent material is obviously not light tight, but a sealing wrapped around the brewing container may solve this problem.

The coating of an at least partly translucent outer compartment may comprise ceramic materials such as aluminum oxides, zirconium oxides, glasses based on silicium oxide or other coating materials such as ethylene vinyl alcohol (EvOH) and combinations thereof.

In an aspect of the invention, said liquid-impermeable barrier extends up to said re-sealable entrance opening, when said liquid is poured out of said exit opening.

By making the liquid-impermeable barrier extend up to the re-sealable entrance opening even at the time the exit opening is established—to allow that the brewed liquid can be poured out of the exit opening—is advantageous in that it hereby is ensured that the aroma material and the un-brewed liquid in the inner compartment cannot pass directly from the inner compartment to exit opening of the discharge arrangement, when liquid is poured out of the exit opening.

In an aspect of the invention, said liquid-impermeable barrier is formed independently from said exit opening blocking device.

Forming the liquid-impermeable barrier as a part/device that is independent from the exit opening blocking device is advantageous in that the liquid-impermeable barrier thereby can still be present and fully functional even if the exit opening blocking device is removed from the brewing device.

In an aspect of the invention, said entrance opening extends substantially the entire width of said brewing device.

Forming the entrance opening so that it extends substantially the entire width of the brewing device is advantageous in that it prevents that adjacent or abutting edge welding are torn when the entrance opening is opened hereby increasing the safety and ensuring the functionality of the brewing device. Furthermore, it enables a simple manufacturing process and a large entrance opening.

In an aspect of the invention, said entrance opening extends substantially the entire length of the upper edge of said brewing device.

To ensure that it is fairly easy to fill the necessary amount of liquid into the brewing device without spilling it is advantageous that the entrance opening is as large as possible and therefore is made to extend substantially the entire width of the upper edge of the brewing device. Furthermore, it ensures that an adjacent or abutting edge welding is not torn when the entrance opening is opened.

In an aspect of the invention, said discharge arrangement comprises an outlet duct for establishing fluid communication between said brewing container and said exit opening.

Preferably, the brewing container and the exit opening are located substantially at either ends of the brewing device and since the brewed liquid in the brewing container has to leave the brewing device through the exit opening it is advantageous to make the discharge arrangement comprises an outlet duct for establishing fluid communication between the brewing container and the exit opening.

In an aspect of the invention, said outlet duct extends alongside said inner compartment.

Arranging the outlet duct alongside the inner compartment is advantageous in that the outlet duct and the inner compartment can be separated by only one welding hereby providing for a more compact and inexpensive brewing device.

In an aspect of the invention, said exit opening is arranged at an upper edge of said brewing device.

It is advantageous to position the exit opening at the upper edge of the device to ensure that the brewed liquid does not overflow through the exit opening e.g. in case an exit opening blocking device is not present and it enables that the brewed liquid can be removed controllably from the brewing device simply by tilting the brewing device to lower the exit opening in relation to the level of the brewed liquid inside the device and thereby pour brewed liquid out of the exit opening in a controlled manner.

In an aspect of the invention, said liquid-impermeable barrier is formed continuous all the way up to the top of the outer compartment.

The invention also provides for use of a disposable brewing device according to any of the above described disposable brewing devices for brewing of a beverage.

BRIEF DESCRIPTION OF THE FIGURES

The invention will be described in the following with reference to the figures in which FIG. 1 illustrate a prior art disposable brewing device, as seen from the side, FIG. 2 illustrate a prior art disposable brewing device, as seen from the front, FIG. 13 illustrates an embodiment of a pour spout comprising a peelable sealing, as seen in perspective, FIG. 14 illustrates an embodiment of a pour spout comprising thread, as seen from the side, FIG. 15 illustrates an embodiment of an exit opening comprising a pouring lip, as seen from the side, FIG. 16 illustrates an exit opening blocking device comprising a tear strip, as seen from the side, and FIG. 17 illustrates an exit opening blocking device comprising a perforated tear line, as seen from the side.

DETAILED DESCRIPTION

For reasons of explanation, parts of the brewing device of FIG. 1 and FIG. 6-9 are shown as partly transparent.

Figures 1, 2:
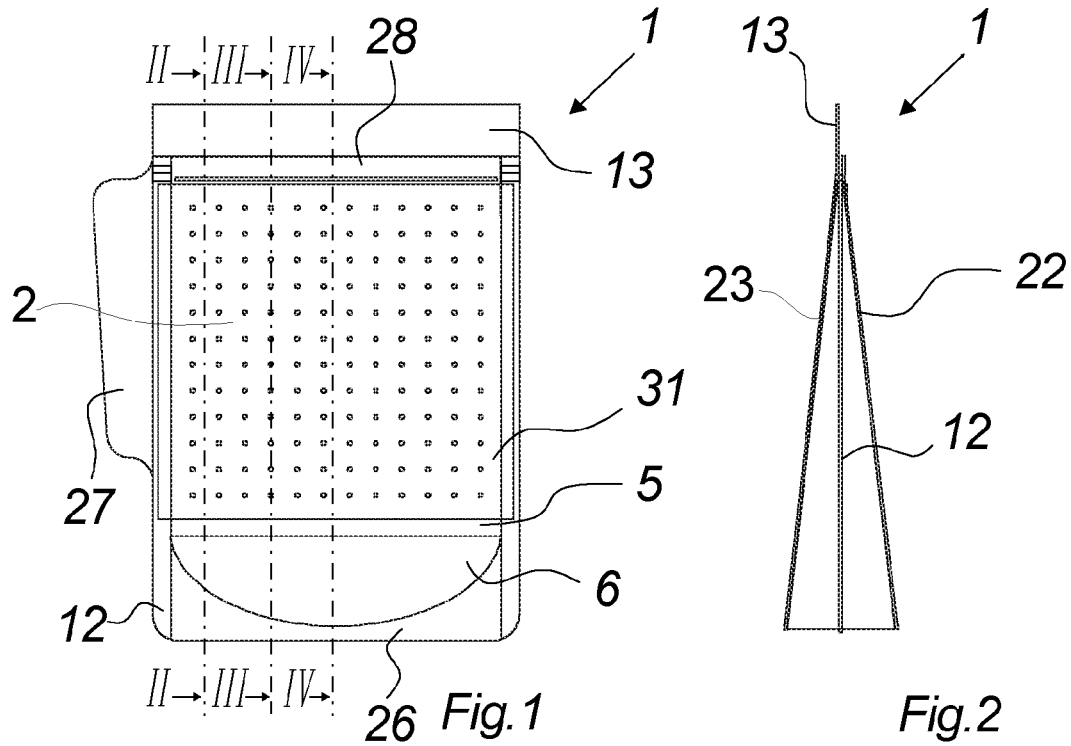

FIGS. 1 and 2 illustrates a front view and a side view, respectively, of a prior art brewing device 1.

The brewing device 1 comprises an outer compartment 5 which in this embodiment also forms a brewing container 6. Sheet materials 22, 23, a bottom welding 26, outer edge welding 12 and a top sealing 28 at the entrance opening 3 collectively define the outer brewing compartment. The sheet material 22, 23 furthermore forms a handle 27. Inner compartment 2 is suspended inside the outer compartment 5 and it comprises an entrance opening 3 with a top sealing or closing, e.g. a flap formed by a sheet portion. The top closing 28 is preferably formed with an adhesive for the purpose of closing the bag when liquid has been poured or injected into the device 1.

At the top of the inner compartment 2 the sheet materials 22, 23 are joined in a peelable sealing, and above the sealing a part of the sheet material 22, 23 forms a clutch-flap. A bottom sheet material 30, see also the FIGS. 3-5, forms a lower part of the outer compartment 5 and the brewing container and the bottom sheet material 30 is laminated to the side welding 12 and is formed by the continuous lamination. The lower arrangement provides a reinforced self-standing arrangement when the outer compartment 5 has been filled at least partly with liquid.

Furthermore the brewing device 1 comprises an inner compartment 2 defined by a filter material 31 and welded to the outer compartment 5 defining sheets 22, 23. The inner compartment 2 comprises an aroma material 4, illustrated in FIGS. 3-5.

Evidently, the fastening of the inner compartment 2 to the outer compartment 5 may be performed in several different ways, e.g. by welding, heat lamination, gluing, etc. and the fastening points may be discrete or continuous, e.g. one or more of the edge welding 12.

The illustrated filter material 31 comprises a polymer film comprising a number of discrete holes of an appropriate size obtained e.g. by stamping. The sizes of the holes may be adjusted to the desired filter function with respect to the applied aroma material 4.

Figures 3, 4, 5:
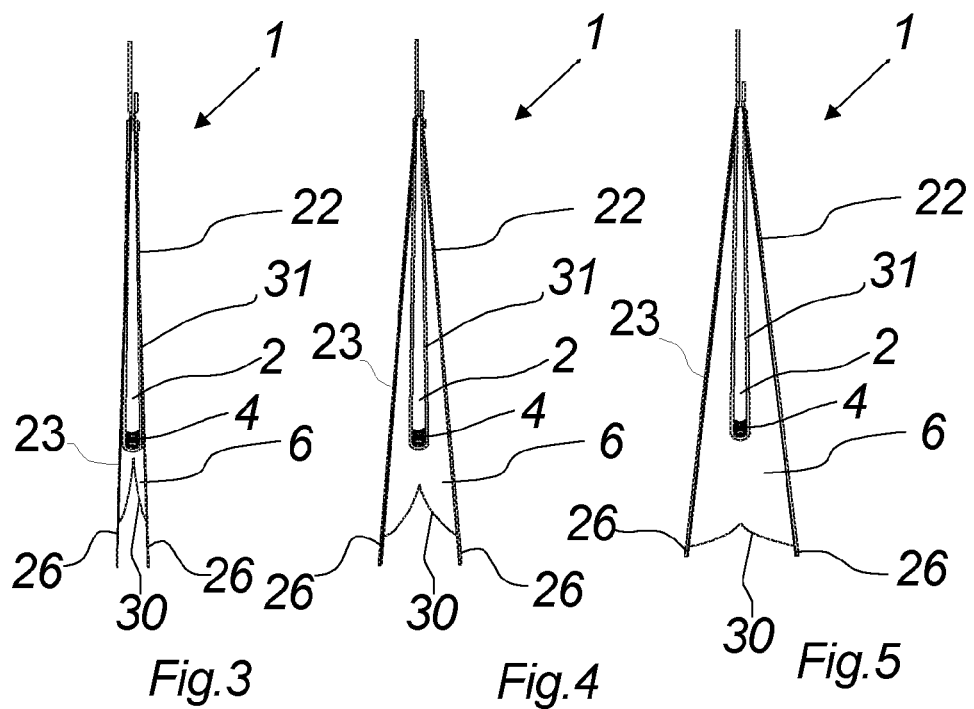
FIG. 3 illustrates a cross-section of the brewing device of FIG. 1 at the line II-II, as seen from the front.
FIG. 4 illustrates a cross-section of the brewing device of FIG. 1 at the line III-III, as seen from the front.
FIG. 5 illustrates a cross-section of the brewing device of FIG. 1 at the line IV-IV, as seen from the front, FIG. 6 illustrate the brewing device of FIG. 1 being opened, as seen in perspective.

In FIGS. 3-5, three different cross-sections of the expanded disposable brewing device of FIG. 1 are showed at the lines II-II, III-III and IV-IV of FIG. 1 respectively.

FIG. 3 illustrates a cross-section at the line II-II of the brewing device 1. The illustrated brewing device 1 basically comprises two compartments 2, 5 as described above, namely an inner compartment 2 formed by a filter material 31 located within an outer compartment 5 basically formed by the sheets 22, 23 and 30 by the above described gathering, e.g. welding. The inner compartment 2 comprises an aroma material 4. The above-described continuous lamination of the bottom sheet material 30 to the sheets 22, 23 forms a part of a contact face 14 at the bottom of the brewing device 1, which may ensure that the brewing device 1 is self-standing when at least outer compartments 5 is at least partly filled with liquid.

FIG. 4 illustrates a cross-section at the line III-III of the unfolded brewing device 1 of FIG. 2 and FIG. 3 at a cross-section a little closer to the line IV-IV of FIG. 1. It is noted that the distance between the inside walls at the bottom of the outer compartment 3 is increased when compared to the cross-section of FIG. 3.

FIG. 5 illustrates a cross-section of the line IV-IV of the unfolded brewing device 1 of FIG. 2-4 in the midst of the brewing device 1 at line IV-IV. It is noted that the distance between the inside walls at the bottom of the outer compartment 5 is increased when compared to the cross-section of FIG. 4.

The sheets 22, 23 and the bottom sheet material 30 may be formed by one single folded sheet. This sheet may comprise a lower arrangement defining welding corresponding to the above described sheet 22, 23 and the bottom sheet material 30 gathering welding 12, 26.

The brewing container materials comprising sheet materials 22, 23 and 30 combined with welding 12 and 26 and the top sealing 28 collectively form an outer sealing of the brewing device 1. This outer sealing may effectively form a barrier for gasses, moisture, aroma and other matters so that diffusion in and out of the brewing container 1 is prevented. Thus, the aroma material 4 contained in the brewing container is hereby protected until the top sealing 28 is broken.

FIG. 6-9 illustrates the process of using an aroma material 4 containing brewing device 1 as described in FIG. 1-5. According to the illustrated embodiment the aroma material 4 comprises coffee grounds.

Figure 6:
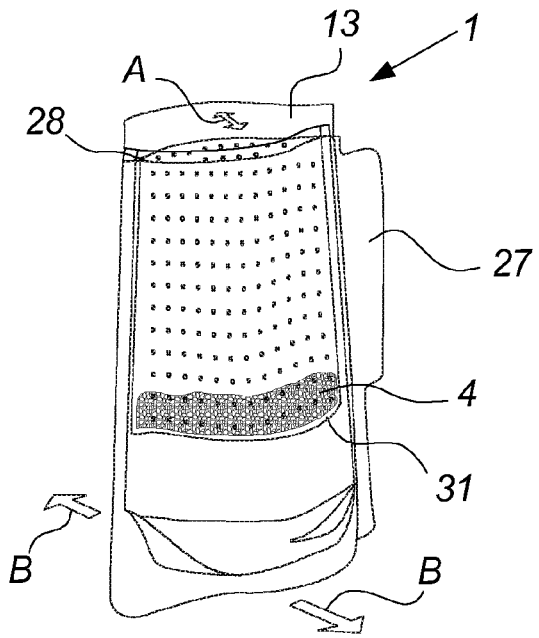

In FIG. 6 the brewing device 1 is initially opened by mechanically stretching the sides in the direction of the arrows A and B. Hereby the top sealing 28 is broken. Clutching and pulling in the upper flaps may perform the stretching to the sides of arrow A.

The initial step of mechanically stretching to the sides of the arrows B may be omitted as the liquid may perform this task during filling.

Figure 7:
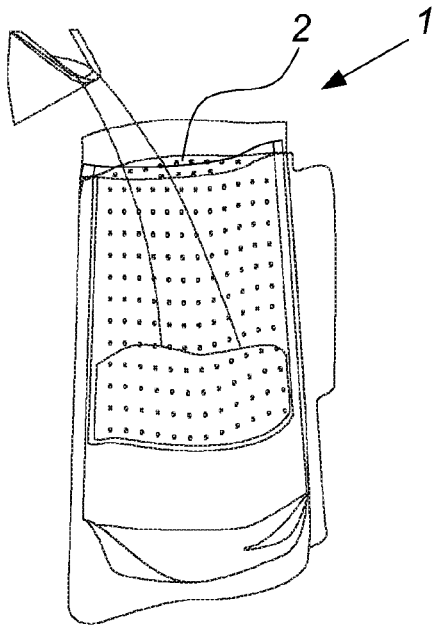
FIG. 7 illustrates the brewing device of FIG. 1 being filled with a liquid, as seen in perspective.

In FIG. 7 a liquid dispenser such as a kettle pours liquid into the brewing device 1. The liquid, preferably hot, mixes with the coffee grounds 4 and forms a liquid coffee suspension within the inner filter compartment 2.

Figure 8:
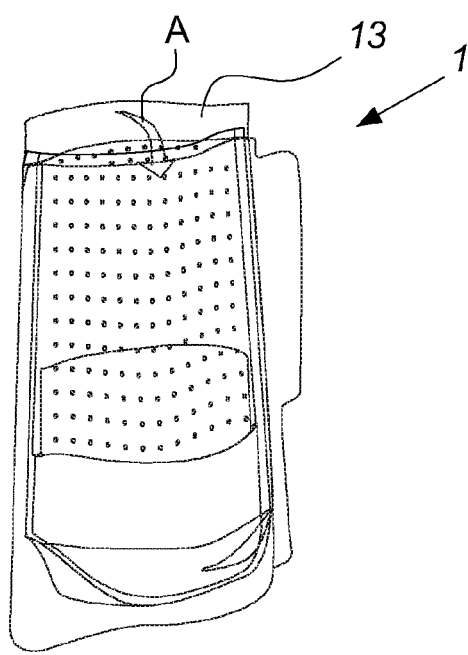
FIG. 8 illustrates the brewing device of FIG. 1, wherein the entrance opening is being re-sealed, as seen in perspective.

In FIG. 8 the top flap 13 is folded in the direction of the arrow A.

When the top flap 13 has been closed, the suspension is now contained within the outer compartment 5 of the brewing device 1—in the brewing container 6 and maybe partly within the inner compartment 2 depending on the amount of liquid poured into the device 1. The closing of the top flap 13 establishes a closed container having an exit opening 8. Typically, the brewing device should now rest for e.g. 1-20 minutes and when brewing e.g. coffee, preferably 2-7 minutes before the brewing is completed.

Figure 9:
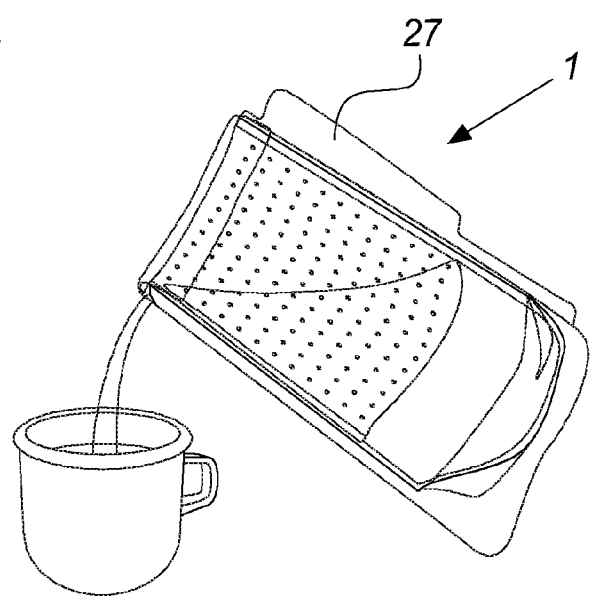
FIG. 9 illustrates the brewing device of FIG. 1 pouring a brewed liquid, as seen in perspective.

In FIG. 9 the brewing has been completed and a user may now, e.g. by means of the handle 27 lift the brewing device 1 and pour the brewed liquid 15, here coffee, into a cup and the drink is ready for intake.

DETAILED DESCRIPTION OF THE INVENTION

Figure 10:
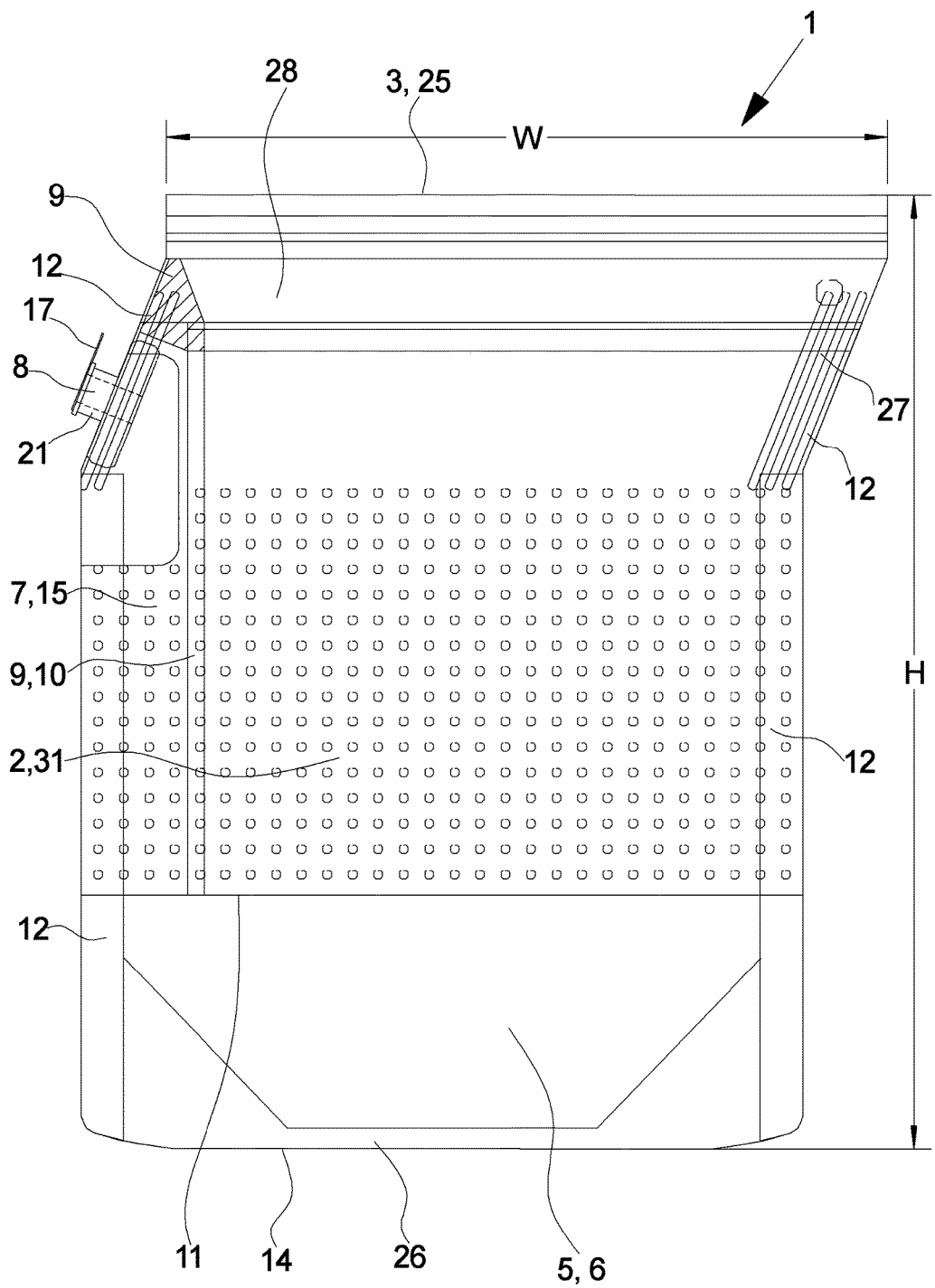
FIG. 10 illustrates a first embodiment of a brewing device according to the invention, as seen from the side.

FIG. 10 illustrates a first embodiment of a brewing device 1 according to the invention, as seen from the side.

In this embodiment the brewing device 1 comprises an outer compartment 5 in which an inner compartment 2 is suspended in and above a brewing container 6.

In this embodiment the inner compartment 2 is formed by a liquid-permeable filter material 31 where the liquid-permeable quality of the filter material 31 is obtained by a perforation of small holes. However in another embodiment the liquid-permeable quality may be obtained by a non-woven fiber material, by woven or non-woven textile, reinforced paper or cardboard or by other means.

The liquid-permeable filter material 31, which is provided with holes, may be described as punctured with a certain density of holes per cm2. In an embodiment of the invention the liquid-permeable filter material 31 is provided with a density of holes in the range of 1-30 holes per cm2, preferably 2-20 holes per cm2 and most preferably 4-12 holes per cm2. In an embodiment of the invention the holes have dimensions in the range of 0.01 mm•0.01 mm to 2.00 mm•2.00 mm, preferably 0.1 mm•0.1 mm to 1.0 mm•1.0 mm, more preferably 0.1 mm•0.1 mm to 0.6 mm •0.6 mm. The preferred size of the hole is an elongated hole of the size 0.2 mm•0.4 mm. The shape of the hole may vary from application to application. In an embodiment of the invention the dimension of the holes is adapted to provide a brewing time of approximately 3-6 minutes under atmospheric pressure.

In an embodiment of the invention the inner compartment 2 is made of a material selected from the group of polypropylene, polyethylene, polyesters, polyamides, polyolefines or other polymers.

The inner compartment 2 is formed from a single sheet of filter material 31 which is folded at the middle and the two upper ends are connected to the outer compartment 5 just below the top sealing 28 by means of welding.

The filter material 31 extends in the full width W of the outer compartment 5 and is therefore also connected to the outer compartment 5 along the sides by means of the edge weldings 12.

In this embodiment the brewing device 1 also comprises a liquid impermeable barrier 9 defining one side of the inner compartment 2 and forming an outlet duct 15 of the discharge arrangement 7 alongside the inner compartment 2. In this embodiment the liquid impermeable barrier 9 is formed by a welding extending from the bottom 11 of the inner compartment 2 and all the way up to the entrance opening 3 of the inner compartment 2 at the top edge 25 of the device 1.

At the top sealing 28 the liquid impermeable barrier 9 is illustrated by the hatched area to illustrate that the liquid impermeable barrier 9 extends over this entire area in one embodiment or to illustrate that the welding can continue anywhere through this area in another embodiment.

During normal use the re-sealable entrance opening 3 would first be opened to break the top sealing 28. A liquid would then be introduced into the inner compartment 2 to mix with the pre-arranged aroma material 4 in the inner compartment 1. As soon as all the liquid has been poured into the device 1 the entrance opening 3 is re-sealed—in this case by means of the zip slider extending all the way across the top edge substantially in the entire width W of the device 1—to protect the inside of the brewing device 1 from externally imposed foreign objects, to increase the quality of the brewing process (e. g. isolating effect) and to ensure that the device 1 does not overflow, if the device 1 is overturned. A zip slider is a slider comprising flanged interlocking profiles which can easily be engaged and disengaged but as discussed above the re-sealing quality of the entrance opening 3 could be obtained through other means.

Because the inner compartment 2 is suspended inside the outer compartment 5, because the inner compartment 2 is formed by a liquid-permeable filter material 31 and because the brewing device 1 is orientated with the inner compartment 2 facing up, a brewing container 6 is also formed inside the outer compartment 5—primarily at the bottom of the outer compartment 5—into which the liquid is pulled by gravity as it seeps through the aroma material 4 in the inner compartment 1.

When most of the liquid has passed through the filter 31 and the aroma material 4, the liquid level in the brewing container 6 is preferably higher than the bottom 11 of the inner compartment 2 so the aroma material 4 will continue to be soaking in the liquid.

After a desired brewing time the brewed liquid in the brewing container 6 can be poured out of the exit opening 8 by grabbing the handle 12 of the device 1 and tilting it so that the liquid runs through the outlet duct 15 and out through the exit opening 8. If the exit opening 8 is provided with an exit opening blocking device 16 this would obviously be removed before the liquid is poured out.

Because of the presence and location of the liquid-impermeable barrier 9 between the inner compartment 2 and the exit opening 8 it is ensured that no matter how hard you tilt the device 1 during pouring or if you accidently slosh the liquid around inside the brewing device 1 no aroma material 4 or liquid will pass directly from the inner compartment 2 and out through the exit opening 8.

When the brewing device 1 is used for making coffee the brewing process may involve that coffee grounds are mixed with water, causing an infusion process during which the coffee grounds and water may interact, which may include that the coffee grounds absorb water and thereafter fall down while giving off aroma to the water and thereby bringing about a coffee beverage.

In relation to coffee brewing it is an important feature of the brewing device 1 according to the invention that it enables the user to brew coffee in the traditional way. The traditional brewing implies that no pressure above the atmospheric pressure is needed in order to make the water pass through the liquid-permeable filter material 31. Furthermore the brewing device 1 according to the invention advantageously needs no extra or special equipment to function.

In an embodiment of the invention it may be preferred to equip the brewing device 1 with more than one inner compartment 2. The different compartments 2 may be used for different aroma materials 4, which are to be mixed during brewing. Their separation in different compartments 2 secures that they are not mixed before use.

When the brewing device 1 is packed with aroma material 4 such as ground coffee beans having a tendency to loose aroma when exposed to the surroundings, it is of crucial importance that the device is provided with some sort of outer sealing layer that is tight, especially when the amount of aroma material 4 is relatively small compared to larger coffee packages.

This outer sealing could comprise at least one polymer film, metallized or coated film, EvOH-coating, metal foil, sealant, or combinations thereof.

The sheets 22, 23, 30 forming the outer compartment 5 could also be formed as a multi-layer structure comprising an outside polymer film, an intermediate barrier layer and an inside layer of polymer sealant.

Likewise in an embodiment of the invention a preferred combination of materials for a multi-layer structure, which forms the bottom material 30 of the brewing device 1 or of a separate outer sealing may comprise a similar multi-layer structure, wherein the intermediate metal foil barrier layer is substituted for a barrier layer comprising a polymer film being metallized and coated with e.g. EvOH (ethylene vinyl alcohol).

In an embodiment of the invention differences in flexibility of the sidewall material 22, 23 and bottom material 30 of the brewing device 1 are manipulated by substitutions, e.g. as described above, where the substitution of metal foil with a metallized film coated with EvOH may facilitate a more flexible multi-layer material.

Preferably, the disposable brewing device 1 is intended to use with liquid such as water or e.g. alcohol or milk. In the present invention a disposable device 1 is defined as a device 1 intended for one or a few times of use.

Figure 11:
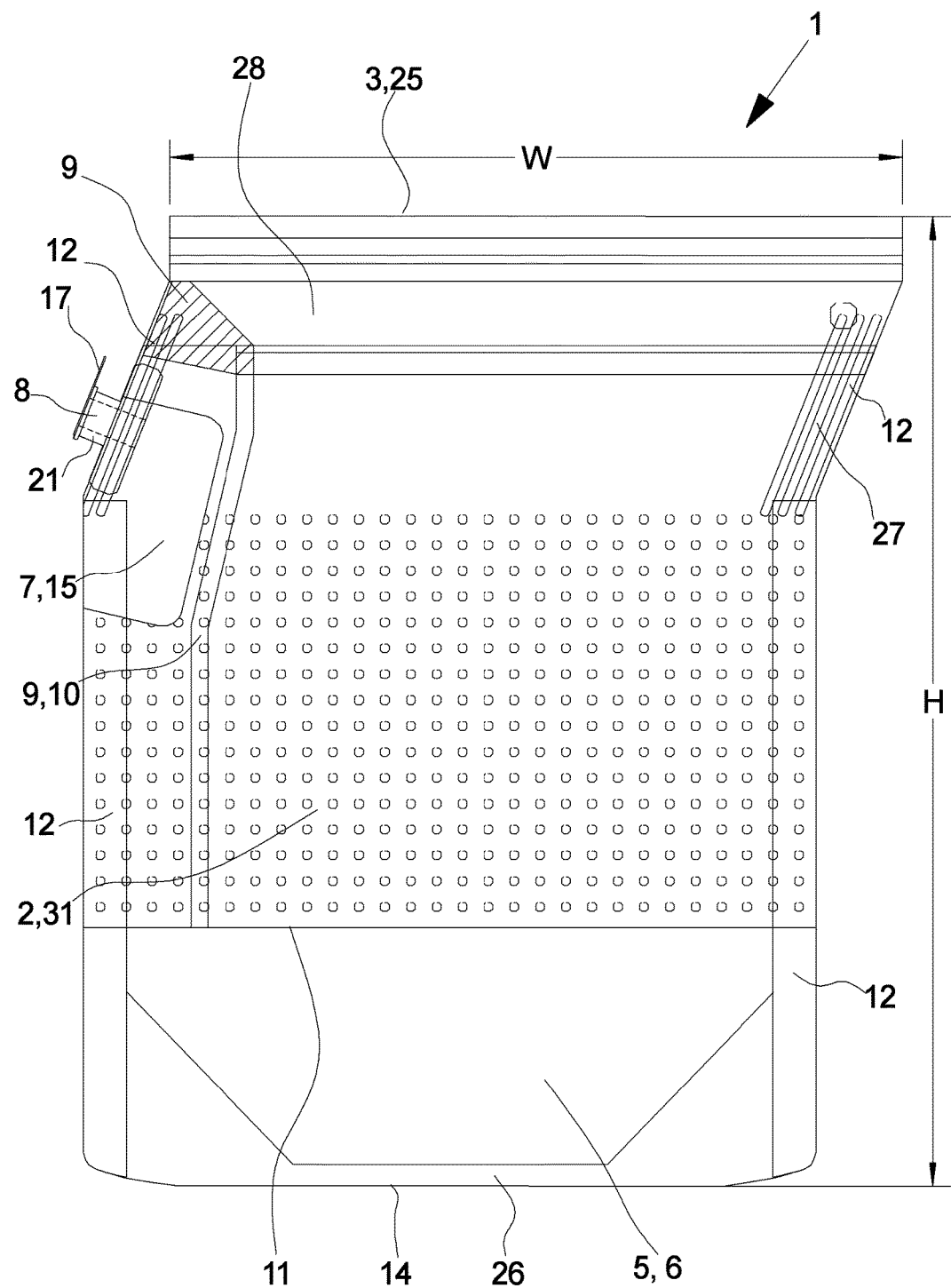
FIG. 11 illustrates a second embodiment of a brewing device according to the invention, as seen from the side.

FIG. 11 illustrates a second embodiment of a brewing device 1 according to the invention, as seen from the side.

In this embodiment of the invention the liquid impermeable barrier 9 is formed to substantially maintain the width of the outlet duct 15 in its entire extent. Thus, as a consequence the top opening of the inner compartment 2 is slightly smaller than in FIG. 10 and the upper part (the hatched area) of the liquid impermeable barrier 9 is slightly bigger.

In this embodiment the liquid impermeable barrier 9 is extending continuously substantially from the bottom 11 of the inner compartment 2 and up to the entrance opening 3 but in another embodiment the barrier 9 could have another extend i.e. it could extend down into the brewing container or it could be formed discontinuous e.g. as spot welding arranged so close together that they together form a liquid impermeable barrier 9.

In this embodiment of the invention the discharge arrangement 7 comprises a pour spout 21 forming the exit opening 8.

During manufacturing, the pour spout 21 is placed between the first layer of sheet material 22 forming one side of the outer compartment 5 and a second layer of sheet material 23 forming the other side of the outer compartment 5 where after it is welded to the sheets 22, 23 when the side edges 12 are welded. However, in another embodiment the pour spout 21 could be attached in another way, such as by means of adhesive or other.

In this embodiment the exit opening 8 is provided with an exit opening blocking device 16 in the form of a peelable sealing 17 which is to be removed before liquid can be poured out of the exit opening 8.

Figure 12:
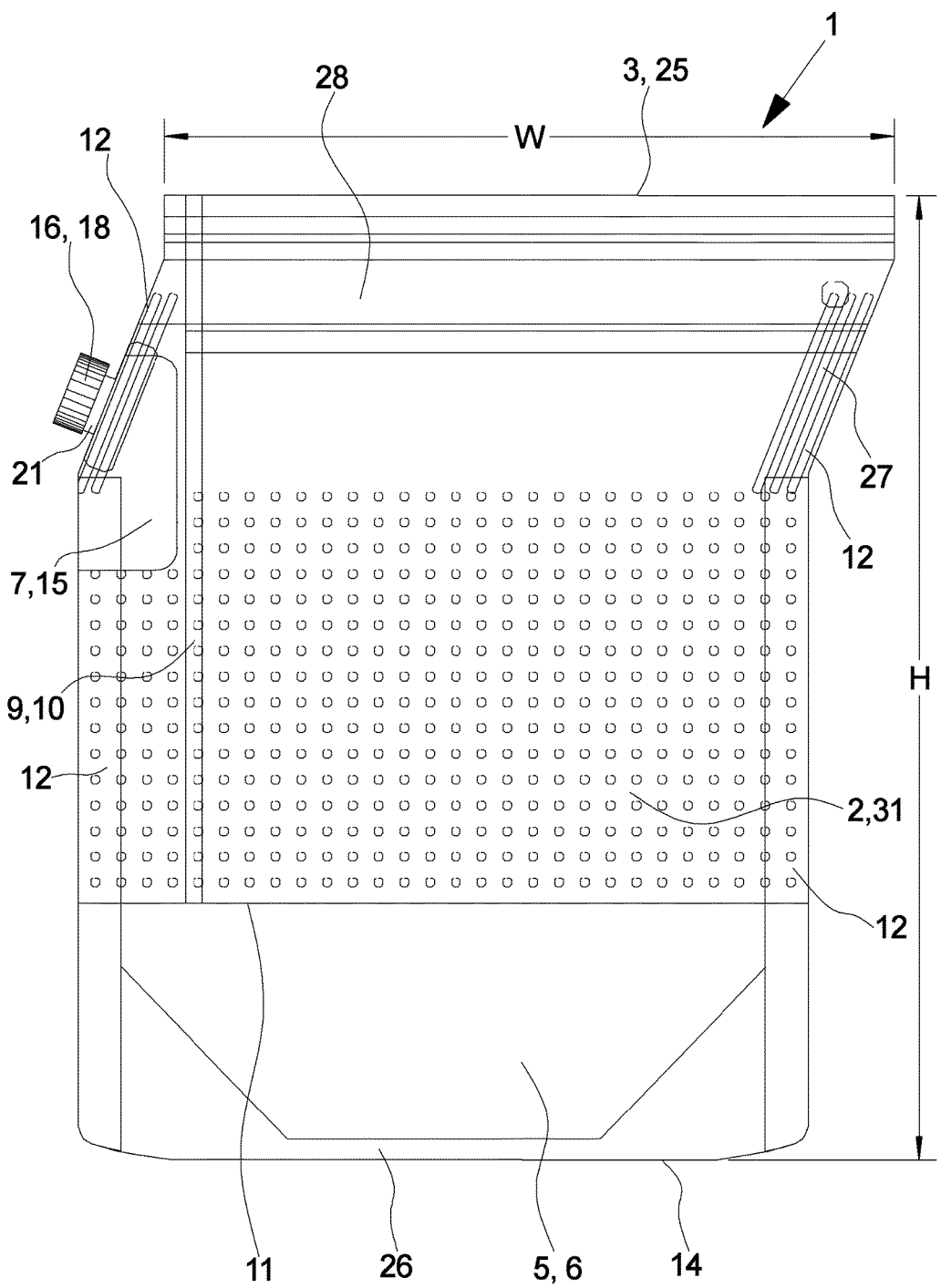
FIG. 12 illustrates a third embodiment of a brewing device according to the invention, as seen from the side.

FIG. 12 illustrates a third embodiment of a brewing device 1 according to the invention, as seen from the side.

In this embodiment of the invention the liquid impermeable barrier 9 extends all the way across the zip slider of the re-sealable entrance opening 3. In another embodiment the zip slider—or similar re-sealing device—would not extend all the way across the upper edge 25 of the brewing device 1 and in such case the liquid impermeable barrier 9 would extend across the path of the re-sealable entrance opening 3.

In this embodiment the exit opening 8 is provided with an exit opening blocking device 16 in the form of a screw cap 18 which can be screwed on and off as desired to selectively allow passage through the exit opening 8.

FIG. 13 illustrates an embodiment of a pour spout 21 comprising a peelable sealing 17, as seen in perspective.

In this embodiment the peelable sealing 17 is attached to the pour spout 21 by means of adhesive but in another embodiment it could also be welded to the spout 21. The peelable sealing 17 covers the exit opening 8 which in this case is a centrally arranged hole extending all the way through the pour sprout 21.

In another embodiment the exit opening blocking device 16 could also be formed as some sort of plug, blocking the exit opening.

FIG. 14 illustrates an embodiment of a pour spout 21 comprising thread 29, as seen from the side.

Providing the pour spout 21 or any other form of exit opening 8 with thread 29 is advantageous in that it allows easy use of a screw cap 18 or that some sort of pouring device could be screwed onto the pour spout 21 such as a more or less flexible nozzle.

FIG. 15 illustrates an embodiment of an exit opening 8 comprising a pouring lip 24, as seen from the side.

Providing the exit opening 8 with a pouring lip 24 is advantageous in that it can prevent the exit opening from dripping during or after use. In an embodiment the pouring lip 24 could be provided on a pour spout 21.

FIG. 16 illustrates an exit opening blocking device 16 comprising a tear strip 20, as seen from the side.

In this embodiment of the invention a tear strip 20 is placed between the first layer of sheet material 22 forming one side of the outer compartment 5 and a second layer of sheet material 23 forming the other side of the outer compartment 5 before the two sheets 22, 23 are welded together at the outer edges 12. The free end of the tear strip 20 can then be firmly grabbed and pulled out thereby breaking the welding 12 and forming an exit opening 8 through which the liquid inside the brewing device 1 may exit the device 1.

FIG. 17 illustrates an exit opening blocking device 16 comprising a perforated tear line 19, as seen from the side.

In this embodiment a perforated tear line 19 is formed all the way through the device so that the exit opening blocking device 16 may easily be removed by tearing the device 1 along the tear line 19.

It should be noted that any reference to top, upper, side, bottom and other orientational references regarding the brewing device 1 and the part of the brewing device 1 is made in relation to the brewing device 1 when it is in use for brewing i.e. when the brewing device 1 is standing up to form a self-supporting brewing kettle or pot.

The invention has been exemplified above with reference to specific examples of brewing devices 1, compartments 2, 5, exit openings 8 and other. However, it should be understood that the invention is not limited to the particular examples described above but may be designed and altered in a multitude of varieties within the scope of the invention as specified in the claims.

The invention claimed is:

1. A disposable brewing device comprising
at least one inner compartment, said inner compartment being formed at least partly by a liquid-permeable material and comprising an entrance opening for introducing liquid into said brewing device, wherein the entrance opening is re-sealable;
aroma material being contained within said at least one inner compartment,
at least one outer compartment forming a brewing container, said brewing container being formed by a liquid-impermeable material, said at least one inner compartment being integrated within said outer compartment,
said outer compartment further comprising a discharge arrangement including an exit opening through which said liquid exits said brewing device, and
wherein a liquid-impermeable barrier is arranged between said at least one inner compartment and said exit opening to substantially block said aroma material and liquid in said inner compartment from passing directly from said at least one inner compartment and out through said exit opening, when said liquid is poured out of said exit opening, and said liquid-impermeable barrier extends continuously between a bottom of said at least one inner compartment and said entrance opening.

2. A disposable brewing device according to claim 1, wherein said liquid-impermeable barrier is formed integrally with said at least one outer compartment.

3. A disposable brewing device according to claim 1, wherein said liquid-impermeable barrier is formed by a welding between said discharge arrangement and at least one of said at least one inner compartment.

4. A disposable brewing device according to claim 1, wherein said exit opening is arranged near said entrance opening.

5. A disposable brewing device according to claim 1, wherein said liquid-impermeable barrier is formed continuous with an outer edge welding of said brewing container, wherein said outer edge welding is an outer edge welding at said exit opening.

6. A disposable brewing device according to claim 1, wherein said discharge arrangement is arranged alongside said at least one inner compartment.

7. A disposable brewing device according to claim 1, wherein said outer compartment is formed by a flexible film material.

8. A disposable brewing device according to claim 1, wherein said brewing device comprises a substantially air-, aroma-, and liquid-impermeable outer sealing.

9. A disposable brewing device according to claim 8, wherein said brewing container forms said outer sealing.

10. A disposable brewing device according to claim 1, wherein said brewing container is formed as a stand-up pouch, having a contact face adapted for maintaining the longitudinal extent of said brewing device in a substantial vertical stand-up position.

11. A disposable brewing device according to claim 1, wherein said at least one outer compartment being formed at least partly by a film material to be expandable from a non-expanded state when filled with liquid.

12. A disposable brewing device according to claim 1, wherein said brewing device being self-standing/self-supported during use for brewing.

13. A disposable brewing device according to claim 1, wherein said brewing container and said inner compartment are formed as bags or pouches assembled by one or more welding at one or more edges.

14. A disposable brewing device according to claim 1, wherein said inner compartment is suspended inside said brewing container.

15. A disposable brewing device according to claim 1, wherein said discharge arrangement also comprises an exit opening blocking device.

16. A disposable brewing device according to claim 15, wherein said exit opening blocking device comprises a peelable sealing.

17. A disposable brewing device according to claim 15, wherein said exit opening blocking device comprises a screw cap.

18. A disposable brewing device according to claim 15, wherein said exit opening blocking device comprises a perforated tear line.

* * * * *